US006847032B2

(12) United States Patent
Grier et al.

(10) Patent No.: US 6,847,032 B2
(45) Date of Patent: *Jan. 25, 2005

(54) OPTICAL PERISTALTIC PUMPING WITH OPTICAL TRAPS

(75) Inventors: David G. Grier, Chicago, IL (US); Sven Holger Behrens, Mannheim (DE)

(73) Assignee: University of Chicago, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/651,370

(22) Filed: Aug. 29, 2003

(65) Prior Publication Data

US 2004/0051034 A1 Mar. 18, 2004

Related U.S. Application Data

(63) Continuation of application No. 09/875,812, filed on Jun. 6, 2001, now Pat. No. 6,639,208.

(51) Int. Cl.$^7$ ............................................. H05H 3/05
(52) U.S. Cl. ................................................. 250/251
(58) Field of Search .......................................... 250/251

(56) References Cited

U.S. PATENT DOCUMENTS

| | | | |
|---|---|---|---|
| 3,808,550 A | 4/1974 | Ashkin | 250/251 |
| 6,055,106 A | 4/2000 | Grier et al. | 359/566 |
| 6,416,190 B1 | 7/2002 | Grier et al. | 359/614 |
| 6,639,208 B2 * | 10/2003 | Grier et al. | 250/251 |

* cited by examiner

*Primary Examiner*—Jack I. Berman
(74) *Attorney, Agent, or Firm*—Foley & Lardner

(57) ABSTRACT

A method of use for holographic optical traps or gradients in which repetitive cycling of a small number of appropriately designed arrays of traps are used for general and very complex manipulations of particles and volumes of matter. Material transport results from a process resembling peristaltic pumping, with the sequence of holographically-defined trapping or holding manifolds resembling the states of a physical peristaltic pump.

16 Claims, 5 Drawing Sheets

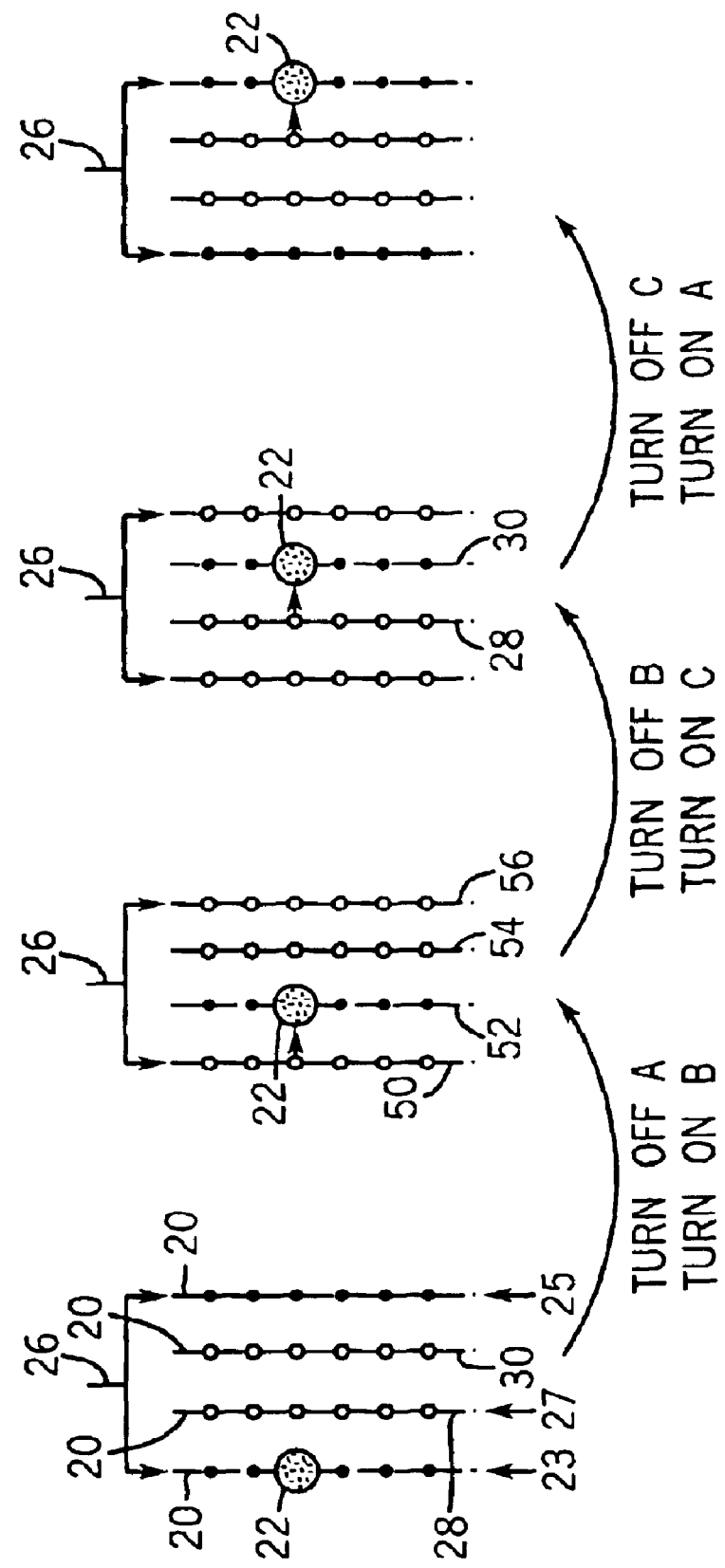

US 6,847,032 B2

OPTICAL PERISTALTIC PUMPING WITH OPTICAL TRAPS

This application is a continuation of application Ser. No. 09/875,812 filed Jun. 6, 2001 now U.S. Pat. No. 6,639,208.

This invention was made with U.S. Government support under Contract No. DMR-9730189 awarded by the National Science Foundation, and through the MRSEC Program of the National Science Foundation under Award No. DMR-9880595. The U.S. Government also has certain rights to the invention pursuant to these contracts and awards.

FIELD OF THE INVENTION

The present invention is directed generally to a method and apparatus for controlling and manipulating small particles, a movable mass or a deformable structure. More particularly, the present invention is directed to a method and apparatus for using holographic optical traps to control and manipulate particles and volumes of matter in both general and complex ways.

BACKGROUND OF THE INVENTION

Optical traps use optical gradient forces to trap, most preferably, micrometer-scale volumes of matter in both two and three dimensions. A holographic form of optical trap can use a computer-generated diffractive optical element to create large numbers of optical traps from a single laser beam. These traps can be arranged in any desired configuration dependent on the need at hand.

Although systems are known to move particles precisely and with a relatively high degree of confidence, conventional systems require a separate hologram to be projected for each discrete step of a particle's motion. Computing multiple holograms can be very time consuming and requires substantial computational effort. Furthermore, computer-addressable projection systems required to implement such computer-generated optical traps or other dynamic optical trap systems, such as scanned optical tweezers, tend to be prohibitively expensive.

SUMMARY OF THE INVENTION

It is therefore an object of the invention to provide an improved method for manipulating particles and volumes of matter in both general and complex methods.

It is an additional object of the invention to provide an improved method for moving particles along a predetermined path with a high degree of accuracy and confidence.

It is still another object of the invention to provide a method for manipulating particles and volumes of matter which removes the computational burden of achieving complex rearrangements.

In accordance with the above objects, projecting a time varying sequence of such trap patterns makes possible dynamic reconfiguration of traps, with each new pattern updating the position of each trap by a distance small enough that particles trapped in the original pattern naturally fall into a corresponding trap in the next. The present invention therefore offers a method for accomplishing complex rearrangements of matter by cycling through a small number of precalculated holographic optical trap patterns. The cycling can be performed mechanically, removing both computational complexity and the expense of a fully general holographic optical trap system.

BRIEF DESCRIPTION OF THE DRAWINGS

FIGS. 3A–3D shows the operative action of an optical peristalsis method;

DETAILED DESCRIPTION OF THE PREFERRED EMBODIMENTS

Figure 1:
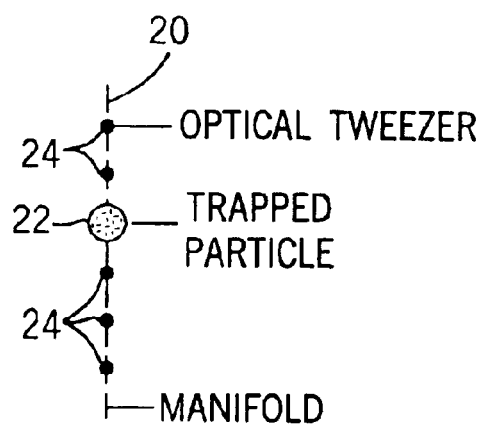
FIG. 1 depicts an individual particle being trapped in an optical trap within a manifold of optical traps, wherein the manifold's position is represented by a dashed line.

Optical peristalsis involves the use of a sequence of pre-calculated holograms projected over time to implement complex redistributions of large numbers of particles over large or selected areas. A key aspect of the invention of optical peristalsis is the non-specific transfer of particles from one manifold of optical traps in a given pattern to the next pattern through the intercession or application of at least two intermediate patterns. The term "pattern" is meant to encompass at least one manifold. FIG. 1 shows a typical manifold 20 of optical traps 24 arranged in a straight line. Each of the traps 24 is capable of trapping a particle 22 of interest, and the traps 24 are spaced relative to each other so that the particle 22 is unlikely to pass through the manifold 20 without falling into an available one of the traps 24 or being blocked by particles already in the trap 24. The particle 22 is drawn as a sphere, but could just as easily be irregularly shaped, or even much larger than the separation between the traps 24.

Figure 2:
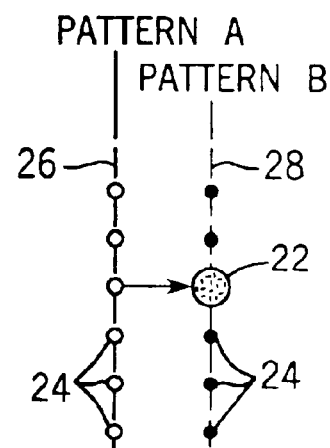
FIG. 2 shows the transfer of an individual particle from a manifold of traps in a first pattern to a manifold of traps in a second pattern.

Operation of the optical peristalsis method proceeds by extinguishing the manifold 20 of the traps 24 which frees the particle 22 to move. If another pattern of the traps 24 is illuminated sufficiently nearby, then the particle 22 will be trapped by one (or more) of the traps 24 in the new pattern. In the illustrated case of FIGS. 3A–3D a pattern includes two of the manifolds 20 at line 23 and 25. However, the next pattern could include only one of the manifolds, along line 27 for example. In effect, the particle 22 is thereby transferred from one of the manifolds 20 of the traps 24 in the first pattern 26 to another one of the manifolds 20 in a second pattern 28. This process is in its simplist form depicted in FIG. 2, and shown more generally in FIGS. 3A–3D. To effect the transfer of the particle 22, the first pattern 26 can be extinguished first; and then the second pattern 28 is illuminated, provided the interval between the two patterns 26 and 28 is short enough to prevent the trapped particle 22 from "wandering off" (out of the optical gradient) before it can be captured by the next, nearest available trap 24. Illuminating the second pattern 28 before extinguishing the first pattern 26 also is another operative embodiment, albeit, more complicated to implement.

A pattern of the traps can therefore include one or more of the manifolds 20 of discrete the traps 24, such as discrete tweezers in one embodiment of the invention. Each of the manifolds 20 can include several of the traps 24 arranged along a one-dimensional curve or line, as shown schematically in FIG. 1, or also on a two-dimensional surface, or within a three-dimensional volume. The notion of a trapping pattern consisting of a collection of the manifolds 20 is useful for visualizing the process of optical peristalsis.

FIG. 3A shows in further detail one of the particles 22 trapped on one manifold 20 of a particular pattern, labeled as the first pattern 26. The first pattern comprises two manifolds 50 and 56. The positions of trapping the manifolds 52 and 54 in the second extinguished pattern 28 (only one manifold for this pattern) and a third extinguished pattern 30 (only one manifold) are also shown. In the first time step, only the first pattern 26 is illuminated. In the next time step represented in FIG. 3B, the first pattern 26 is extinguished and the second pattern 28 is illuminated. This action transfers the particle 22 from the first manifold 50 of the first pattern 26 to the nearby manifold 52 of the second pattern 28. In the next time incremental step shown in FIG. 3C, the second pattern 28 is extinguished and the third pattern 30 is illuminated, thereby transferring the particle 22 again and this time to a manifold 54 on the third pattern 30. In the final time step as shown in FIG. 3D, the third pattern 30 is extinguished and the first pattern 26 is illuminated once again. This transfers the particle 22 to the first pattern 26 on the next manifold 56. Optical peristalsis therefore arises from deterministically transferring the particle 22 from one of the manifolds 20 on a pattern of the optical traps to another of the manifolds 20 on the same second pattern 28 by cycling through a sequence of intermediate patterns.

In a most preferred embodiment of the invention, a minimum of three of the patterns 26, 28 and 30 are needed to advance the particle 22 deterministically from the one manifold 50 on a trapping pattern to the next manifold 52. If only two of the equally spaced patterns 26 and 28 were used, the particle 22 could have a substantial probability of either advancing to the next manifold 52 or returning to the initial manifold 50. In other embodiments, more than the three patterns 26, 28 and 30 can be used to transfer a particle 22 in a particular direction. Methods for illuminating and extinguishing the individual manifolds 20 of optical traps 24 are well understood in the art.

Repeatedly cycling through the first, second and third patterns 26, 28 and 30, respectively, tends to move the particles 22 from left to right in the arrangement described in FIG. 3. Reversing the sequence would drive them right to left. More extensive patterns consisting of more of the manifolds 20 thus can be used to transfer the particles 22 back and forth over the entire field of view of the holographic optical trap system.

There are a variety of ways in which optical peristalsis can be used to effect useful rearrangements of collections of the particles 22. These methods include modifying the shapes of the manifolds 20 within a pattern of the traps 24 by continuous curves. Although a single pattern is described in detail herein, additional intermediate patterns required for transfer between the manifolds 20 would be easily understood and recognized by those skilled in the art. In the examples described herein, the direction of particle flow will be indicated by overlaid arrows.

Figure 4:
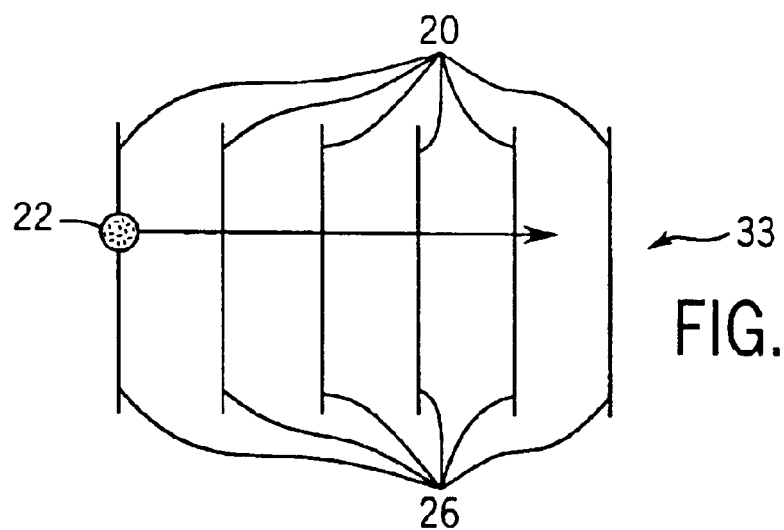
FIG. 4 shows the use of parallel linear manifolds of optical traps for transferring particles along a linear trajectory normal to the manifolds.
Figure 5A:
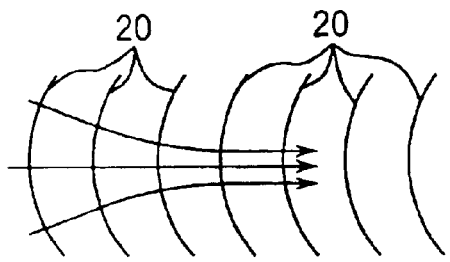
FIG. 5A shows curved manifolds directing particles from the periphery of the pattern towards the centers of curvature.
Figure 5B:
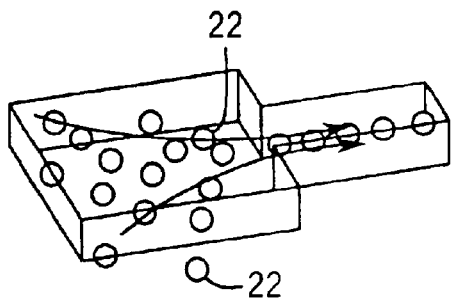
FIG. 5B schematically shows how the pattern described in FIG. 5A can sweep particles into a channel.

FIG. 4 shows one of the patterns 26 from a linear optical peristaltic pump 33. Two or more patterns (not shown) interleaved between the manifolds 20 of this pattern 26 can be activated in sequence to drive one or more trapped particles 22 from left to right. Reversing the sequence transfers the particles 22 from right to left. This pattern, and all of the patterns to be described herein, can be oriented in any desired direction FIGS. 5A and 5B show that patterns consisting of the curved manifolds 20 can be used to concentrate a flow of particles. Conversely, running the same sequence backwards disperses the particles 22. This capability would be useful for directing the particles 22 out of an open region and into a confined region, such as a reservoir. It is not necessary that the individual manifolds 20 have equal curvature, and varying the curvature can be useful in particular situations. For instance, a linear pumping pattern can be used to sweep the particles 22 into a focusing pattern. The individual spacings between the manifolds 20 also do not have to be equal. Regions of a pattern with more closely spaced forms of the manifolds 20 tend to transfer particles 22 more slowly than regions with more widely spaced ones of the manifolds 20. The densely packed manifolds 20 tend to concentrate the particles 22 along the direction of motion, while widely spaced manifolds 20 can be used to spread them out. This approach could be particularly beneficial in a focusing pattern to avoid overcrowding the particles 22 as they are concentrated.

The distribution and density of the traps 24 along a manifold also can be used to control the flow of the particles 22 between the manifolds 20. For instance, the traps 24 may be evenly spaced along each of the manifolds 20 and aligned simply from the one manifold 20 to the next and from one pattern to the next. In other embodiments, more complicated arrangements of the traps 24 along the manifolds 20 and between patterns can have uses for controlling the flow of particles 22 along a sequence of patterns. Similarly, varying the intensity, as well as the spacing, of individual traps 24 along the manifolds 20 in a pattern can have useful applications for controlling transport of the particles 22.

Figure 6A:
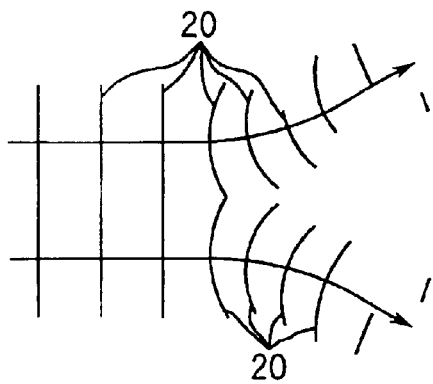
FIG. 6A shows nonuniformly curved manifolds used to divide a flow of particles into two separate flows.

The tendency of the shaped manifolds 20 to direct the flow of the particles 22 can also be used to direct the particles 22 into any desired complicated pattern. The example shown in FIG. 6A shows the shaped manifolds 20 directing one flow of the particles 22 into two. When run in reverse, such a pattern could be used to combine two (or more) flows into one. Although this may not be as efficient, because the particles 22 from one flow will remain near others from the same flow once the manifolds 20 merge, the methodology can still be used to advantage.

Figure 6B:
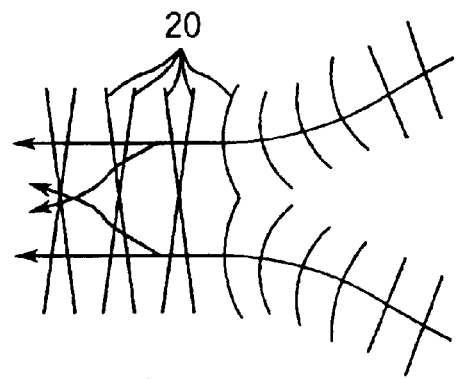
FIG. 6B shows nonuniformly curved manifolds to mix two separate flows into a single, larger flow.

The example shown in FIG. of 6B shows one way to induce mixing of the particles 22 from combined flows. This example shows that the manifolds 20 in a pattern need not be disjoint. The patterns in this systems include a crossed form of the manifolds 20 in the mixing regions. Such crossings can be useful for exchanging the particles 22 between the initially distinct flows. Crossing or otherwise intersecting the simple manifolds 20 to form more complex manifolds 20 introduces a probabilistic element into optical peristalsis. The particles 22 are given a choice of directions to travel near each crossing. Which direction the individual particles 22 choose to follow is determined by random thermal forces at the hand-off from one pattern to the next in a sequence. Hence, the crossings shown in FIG. 6B can lead to a certain degree of mixing.

Figure 7A:
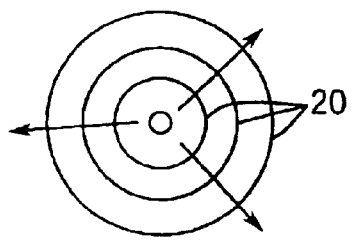
FIG. 7A shows a plurality of concentric manifolds transporting particles out of a region.
Figure 7B:
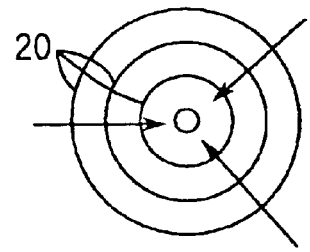
FIG. 7B shows a plurality of concentric manifolds transporting particles into a region.

A pattern of closed form of the manifolds 20, such as the example shown in FIGS. 7A and 7B, can transport the particles 22 into or out of a region. Whether the pattern compacts or rarefies the region depends on the order in which the sequence of patterns is projected. The example in FIG. 7A is useful for clearing the particles 22 out of a region, such as to facilitate tests on the suspending fluid or measurements on isolated particles 22. Such patterns need not be circular, nor need they be confined to the plane. In principle, two-dimensional forms of the manifolds 20 in three-dimensional patterns can be useful for drawing material into a volume, or pushing material out of a volume.

Additionally, it should be noted that competition between optical trapping and other external forces can have useful applications. For example, competition between optical trapping and other external forces could be particularly useful in fractionating the particles 22 from a distribution. As an example, it is helpful to consider the particles 22 entrained in a flow of surrounding fluid. Each of the particles 22 is transported by viscous drag in the local flow field $\vec{u}(\vec{r})$ with a force $\vec{f} = \gamma \vec{u}$ determined by its drag coefficient $\gamma$. For a sphere of radius $\alpha$ in a fluid of viscosity $\eta$, the drag coefficient is given by $\gamma = 6\pi\eta\alpha$ and increases linearly with the particle's radius. A larger particle feels a greater force when held stationary against a flow than a smaller particle. While the force due to viscous drag is one example of an external force, others such as those due to electric or magnetic fields also would pertain in this embodiment described herein.

If the external force is weaker than the optical gradient force of a given one of the optical traps 24, then the particle 22 being transported by optical peristalsis will move much as described hereinbefore. If the external force is greater than the optical gradient force of the optical trap 24, then optical peristalsis may only perturb the motion of the particle 22 in the external field. In the idealized example shown in FIG. 8, one type of the particle 22 is more strongly attracted to the optical traps 24 than it is driven by the external field. In the example shown in FIG. 8, a first particle 60 is more amenable to trapping than a second particle 62 or is less strongly influenced by the external field than the second particle 62. The first particle 60 is therefore transported by optical peristalsis and can be collected. The second particle 62 is more strongly driven by the external field and passes through the pattern of the traps 24, perhaps being diverted to a certain extent from its initial course.

Figure 8:
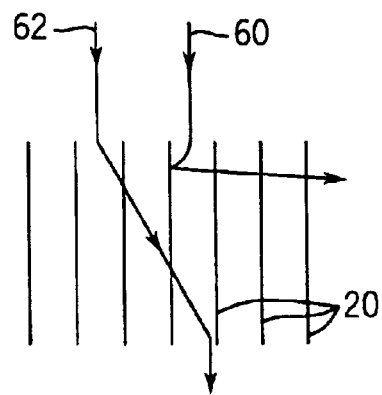
FIG. 8 is a representation of two particles moving in response to an externally applied field and an optical peristalsis pattern.

The two types of the particles 60 and 62 in the example embodiment shown in FIG. 8 are distinguished either by their affinity for the optical traps 24, by their response to the external field, or both. Choosing the spatial distribution, strength, and other characteristics of the optical traps 24 in such a pattern makes fractionation of particles possible, with the selectivity determined by the particles' differing physical characteristics.

The optical fractionation technique has a number of significant advantages. Fractionation occurs along the direction of the applied field in electrophoresis. Optical fractionation can transport the selected fraction laterally. This means that optical fractionation can operate continuously, rather than on one batch at a time. Because optical fractionation relies on holographic optical trap technology, it can be adapted readily to different fractionation problems.

For example, multiple stages of optical fractionation can be applied one after another using the same method and apparatus. Tuning each stage to extract a particular fraction of an initially mixed multicomponent sample then will separate the sample into each of its components, conveniently displacing the sorted components laterally away from the flow, and perhaps transporting them to channels or reservoirs using techniques previously described.

Figure 9:
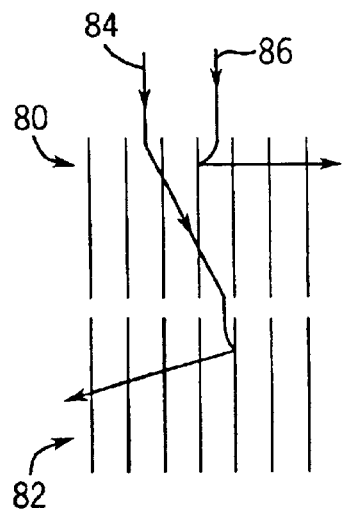
FIG. 9 shows two stages of optical fractionation, with particles of a first type transported to the right and particles of a second type are transported to the left.

The example embodiment shown in FIG. 9 builds on a single fractionation stage by including a second stage of optical fractionation. The external force driving the particles 22 through the region is directed downward. A first pattern, labeled 80 in FIG. 9, selects particles of first type 84 and moves them to the right, diverting, but not collecting particles of second type 86. The second stage of fractionation, labeled portion 82, can feature more intense or more closely spaced examples of the traps 24 with the ability to divert particles 22 of the second type 86 away from the external force. As shown, this second stage pattern 82 transports to the left, still further enhancing the separation between the fractions 84 and 86. Although the two stages of fractionation are presented as conceptually separate, they could be implemented as a single pattern of the optical trap manifolds 20. This process can also be generalized to include more stages and to incorporate transferring fractionated particles for collection.

Figure 10:
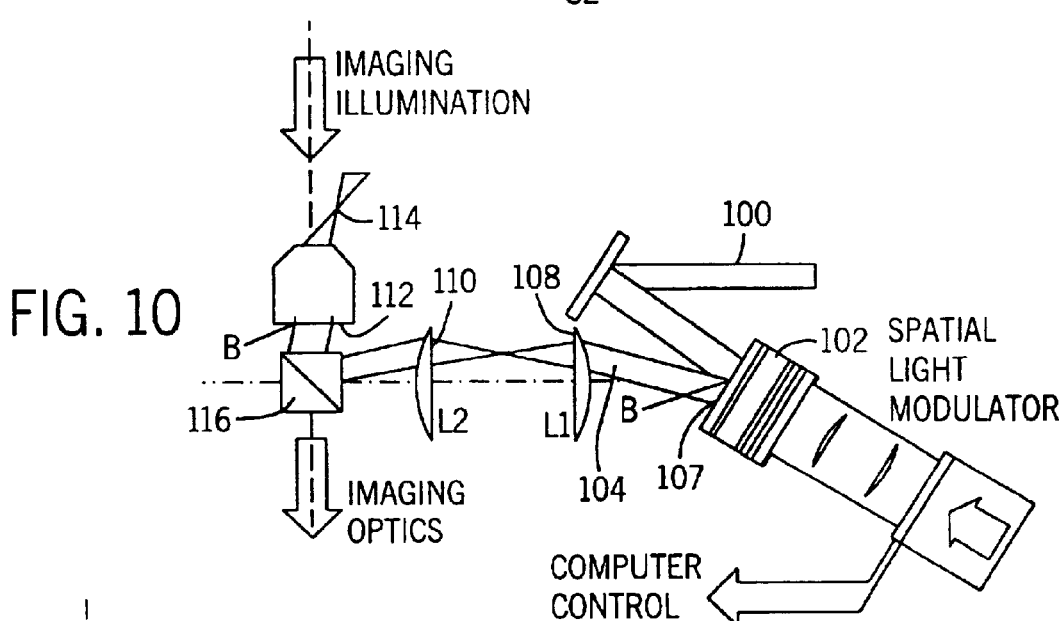
FIG. 10 is a representation of the implementation of optical peristalsis using dynamical holographic optical traps.
Figure 11:
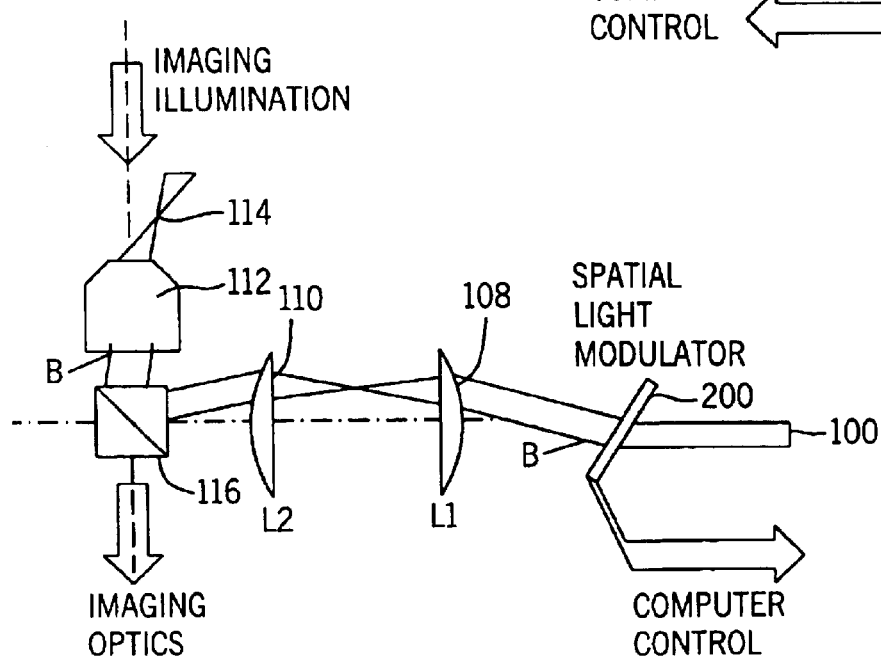
FIG. 11 shows a dynamic holographic optical trap system using a transmission-mode computer-addressed spatial light modulator in an optical train.

As discussed above, optical peristalsis works by repetitively cycling through a sequence of trapping patterns. The dynamic holographic systems represented schematically in FIGS. 10 and 11 are a fully general implementation. In this case, a computer-addressed spatial light modulator 102 creates the configuration of laser beams 104 needed to implement a given pattern of optical traps 114 by encoded the necessary phase modulation onto the wavefront of an input laser beam 100. In principle, such a system can implement any sequence of trapping patterns, and thus any variant of optical peristalsis. In practice, however, the spatial light modulator 102 has physical limitations such as spatial resolution which limit the complexity of the patterns which they encode. Also, such spatial light modulators 102 tend to be costly.

In the embodiment shown in FIG. 10, optical peristalsis can be performed with the dynamical holographic optical traps 114, a typical implementation of which is shown. An input laser beam 100 is reflected off the surface of the computer-addressed spatial light modulator (SLM) 102. The SLM 102 encodes a computer-generated pattern of phase shifts onto the wavefront of the beam 100, thereby splitting it into one or more separate laser beams 104, each emanating from point 107 in the center of the face of the SLM 102. Lenses 108 and 110 relay each of these laser beams 104 to the conjugate point 112 at the center of the back aperture of a high NA objective lens 112. This objective lens 112 focuses each of the laser beams 104 into a separate optical trap 114, only one of which is shown in FIG. 10 for clarity.

A dichroic mirror 116 reflects trapping light into the objective lens 112 while allowing imaging illumination to pass through, thereby permitting images to be formed of the particles being trapped. Updating the phase modulation encoded by the SLM 102 causes a new pattern of the traps 114 to appear. Cycling through a sequence of optical peristalsis patterns in this manner implements the corresponding optical peristalsis process. Because this system can be reconfigured in software, it represents a general implementation of optical peristalsis. In another embodiment shown in FIG. 11, the dynamic holographic optical trap system uses a transmission-mode computer-addressed spatial light modulator 200 in an optical train otherwise similar to that in FIG. 10. This system also can be used to implement optical peristalsis by cycling through a sequence of trapping patterns.

Figure 12:
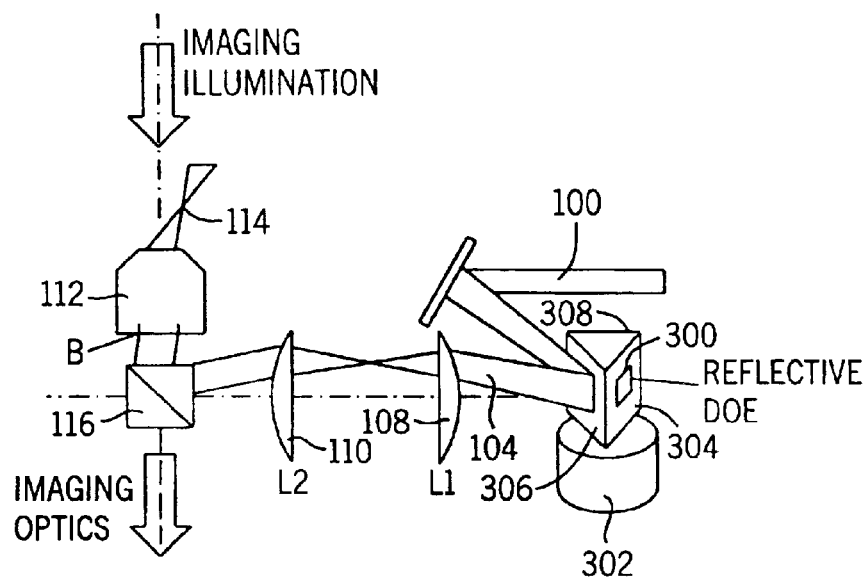
FIG. 12 shows the mechanical cycling of a sequence of static computer-generated diffractive optical elements.

Implementing optical peristalsis does not necessarily require the generality and reconfigurability offered by a dynamic holographic optical trap system. Instead, implementing optical peristalsis preferably uses a holographic optical trap system capable of projecting a (small) sequence of otherwise static patterns. In its simplest preferred form, optical peristalsis can be implemented by mechanically cycling through a sequence of phase patterns to implement a corresponding sequence of holographic optical trapping patterns. One particularly useful embodiment appears in FIG. 12. As shown in FIG. 12, the phase patterns needed to implement a particular optical peristalsis process are encoded in the surface relief of reflective diffractive optical elements 304, 306 and 308. These elements 304, 306, and 308 are mounted on the face of a prism 300, and each is rotated into place by a motor 302. Reversing the motor's rotation reverses the sequence of patterns and thus the direction of optical peristalsis. Rotating the prism 300 with the motor 302 orients each of the patterns in the input laser beam so that the diffracted beams created by the aligned diffractive optical elements 304, 306 and 308 all create optical traps 114. Stepping the motor 302 through each of the patterns in sequence implements optical peristalsis. Prisms with more than three patterns can be employed, if desired or necessary.

Figure 13:
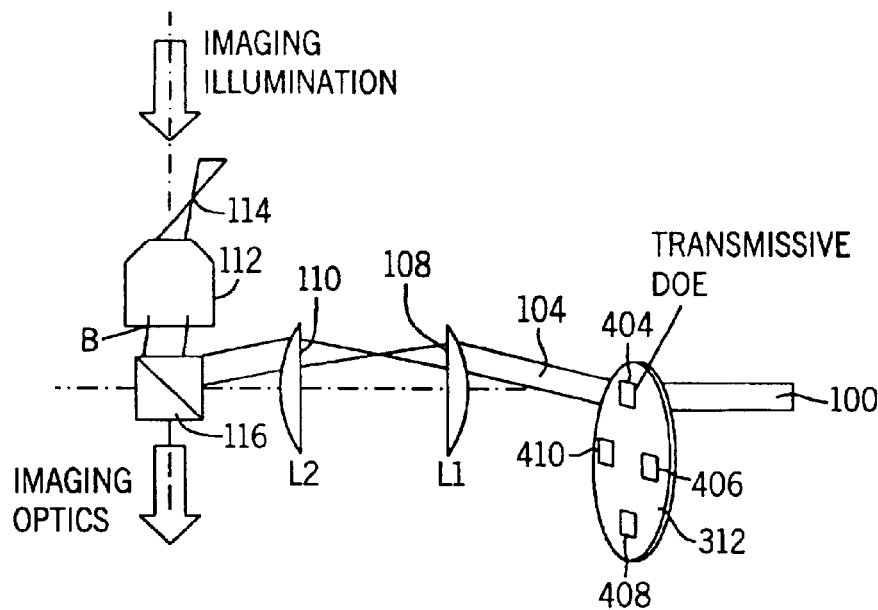
FIG. 13 is a representation of a mechanically cycled optical peristalsis system using transmissive computer-generated diffractive optical elements arranged on the periphery of a disc.

Mounting a sequence of fixed reflective diffractive optical elements 304, 306 and 308 on the face of a rotating prism 300 can have other uses in holographic optical trap methodologies. Similarly, transmissive diffractive optical elements 404, 406, 408 and 410 can be located on the periphery of a disk 312 and rotated into the beam 100, as shown in FIG. 13, or into a reflective optical train in sequence. This also has potential applications beyond optical peristalsis. In FIG. 13, for example, each of the diffractive optical elements 404, 406, 408 and 410 is rotated into the optical train to project one pattern of the optical peristalsis sequence.

Static reflective or transmissive diffractive optical elements can be fabricated with feature sizes down to the diffraction limit, can have essentially continuous phase encoding, and thus can implement a wider variety of more complicated trapping patterns than can spatial light modulators. Such elements can be produced much more cheaply and do not require a computer to operate. The sequence of patterns in such a system can be changed by changing the prism or disk of diffractive optical elements. In this sense, this implementation is less general than that based on computer-addressed spatial light modulators.

Because only a small number of precalculated diffractive optical elements are required to implement optical peristalsis, switchable phase gratings also can be used. The benefits of such an approach include, for example: freedom from moving parts which can drift out of alignment and wear out, the absence of motors which cause vibration and radiate stray electric and magnetic fields, reduction in power requirements and improved compactness.

Encoding high-quality phase holograms on film media will allow optical peristalsis to be implemented with the equivalent of film loops. By offering high-speed cycling through large numbers of diffractive optical elements, film-based implementations of holographic optical traps will have applications beyond optical peristalsis.

Figure 14:
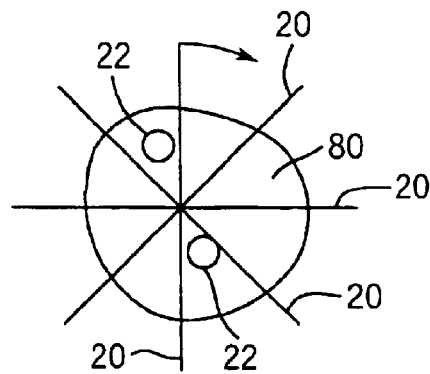
FIG. 14 shows a plurality of manifolds of optical traps trapping an extended object and rotating the object.
Figure 15:
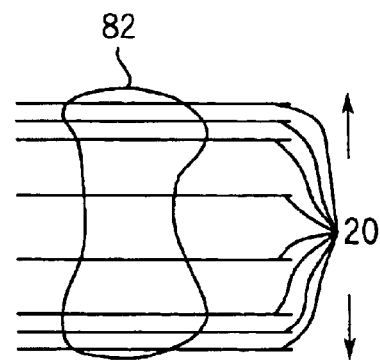
FIG. 15 shows the use of manifolds of optical traps trapping an extended deformable object.

Optical peristalsis also can be useful for particles and other materials such as biological cells which are larger than the physical separation between the traps in an optical peristalsis pattern. Similarly, materials such as proteins, DNA, or molecules could also be manipulated using optical peristalsis. A large object trapped on a "bed of nails" optical trapping pattern still can be moved by translating the bed of nails. Rather than defining a single trapping region, however, an optical peristalsis pattern can establish a large field of traps suitable for immobilizing a large object wherever it is found. Updating the pattern with small displacements, as described above, then will displace the entire object. Potential applications include translating an extended sample into a region where it can undergo tests, rotating the object for examination, or controllably deforming the object. For example, in the embodiment of FIG. 14, the manifolds 20 of included optical traps are shown trapping an extended object 80. Updating the pattern with the manifolds 20 will tend to rotate the extended object 80. Similarly, FIG. 15 shows the manifolds 20 of optical traps trapping an extended deformable object 82. The object 82 is more strongly trapped by denser regions of traps, and moving these regions outward in subsequent patterns tends to stretch the object 82.

Each optical peristalsis sequence performs one specific operation. In some applications, it can be desirable to perform a series of optical peristalsis operations, with the order of the series perhaps depending on the outcome of the preceding operations. For example, optical peristalsis can be used to move a living cell into the center of a microscope's field of view for reproducible observation. A second sequence then could be engaged to rotate the cell into a desired orientation. Then a third sequence can implement a particular test. Based on the outcome of that test, additional optical peristalsis sequences can be selected to collect the cell or dispose of it. Each of these sequences can be precalculated, thereby removing much of the computational burden from the holographic optical trap system. Similarly, different subsequences of optical peristalsis operations could be incorporated into a single program, wherein a first subsequence could separate particles into two or more distinct flows, a second subsequence could disperse particles from a particular location, a third subsequence could mix two separate streams of particles into a single flow, a fourth subsequence could concentrate a plurality of particles into a particle region, and particles can be "moved" from pattern to pattern in a variety of other ways as well. A variety of combinations of subsequences such as those described herein could be incorporated into a single program, and these subsequences could be used sequentially and/or simultaneously as needed using a variety of types of optical gradients as described herein. Because very few diffractive optical elements are required to implement any one of the sequences, only modest elaboration of the proposed implementations would be needed to select among a collection of available sequences for such multistage operations.

Additionally, it is also possible to practice the present invention without the use of optical traps as conventionally understood to require specific optical gradient conditions to hold a particle. For example, a plurality of deterministic optical gradients can be established and incorporated into a plurality of manifolds and patterns as generally described above. These optical deterministic gradients operate to "hold" or restrain, but not necessarily form an optical trap, for individual particles in a particular position for a sufficient period of time in sequence to generate an optical peristalsis effect. In other words, repeatedly cycling through first, second, and third patterns of deterministic optical gradients will move individual particles along a designated path. The optical gradients are deterministic in a sense that the conditions that are applied are sufficient to achieve the intended result with more than just a mere probability of success.

While preferred embodiments of the invention have been shown and described, it will be clear to those skilled in the art that various changes and modifications can be made without departing from the invention in its broader aspects as set forth in the claims provided hereinafter.

What is claimed is:

1. A method of transferring a particle, comprising the steps of:
   providing a first beam of laser light;
   forming a plurality of additional beams of laser light from the first beam of laser light;
   establishing an optical trap for at least two of the additional beams of laser light, each said optical trap associated with a single one of the additional beams of laser light;
   providing a plurality of manifolds over a time sequence, each of the plurality of manifolds comprising at least one optical trap with each of the plurality of manifolds spaced apart in the time sequence; and
   sequentially illuminating and extinguishing over the time sequence each of the manifolds, enabling the capture and transfer of the particle from one of the manifolds to another of the manifolds, wherein the capture and transfer of the particle causes the particle to be transported by the plurality of manifolds.

2. The method as defined in claim 1 wherein each of the plurality of manifolds comprises a line of optical traps.

3. The method as defined in claim 2 wherein the plurality of manifolds comprise a plurality of lines of optical traps, each of the lines of optical traps sequentially activated and deactivated to enable capture and transport of the particle.

4. The method as defined in claim 3 wherein the in the plurality of lines of optical traps are aligned substantially parallel.

5. The method as defined in claim 3 wherein the plurality of lines of optical traps includes curved lines, each line having a radius of curvature.

6. The method as defined in claim 1 wherein the plurality of manifolds comprise interwoven patterns.

7. A method of performing optical peristalsis for manipulating matter, comprising the steps of:
   providing a first beam of laser light;
   forming a plurality of additional beams of laser light from the first beam of laser light;
   establishing an optical trap for at least two of the additional beams of laser light with each said optical trap associated with a single one of the additional beams of laser light; and
   providing a plurality of manifolds of the optical traps with each of the manifolds spaced apart over time and space to enable forming lines of optical traps at different spatial locations for manipulating the matter in time and space.

8. The method as defined in claim 7 wherein the matter comprises at least one of a collection of particles and a manipulable mass.

9. The method as defined in claim 7 wherein the plurality manifolds are used to manipulate biological material.

10. The method as defined in claim 9 wherein the manipulation involves moving a biological cell to at least one of a desired location and orientation.

11. The method defined in claim 9 wherein the manipulation involves deforming the biological material.

12. A method of manipulating a biological material, comprising the steps of:
    providing a first beam of laser light;
    forming a plurality of additional beams of laser light from the first beam of laser light; and
    establishing deterministic optical gradient conditions for each of the additional beams of laser light for manipulating biological material by establishing a plurality of manifolds over time and space with each of the manifolds activated and then sequentially extinguished over time and space enabling the manipulation of the biological material.

13. The method as defined in claim 12 wherein the plurality of manifolds comprise a plurality of lines of optical traps.

14. The method as defined in claim 12 wherein each of the manifolds have an associated radius of curvature for the lines of optical traps.

15. The method as defined in claim 12 wherein the biological material comprises a collection of biological particles.

16. The method as defined in claim 15 wherein the particles are separated into a plurality of different particles.

* * * * *